United States Patent Office 3,002,375
Patented Oct. 3, 1961

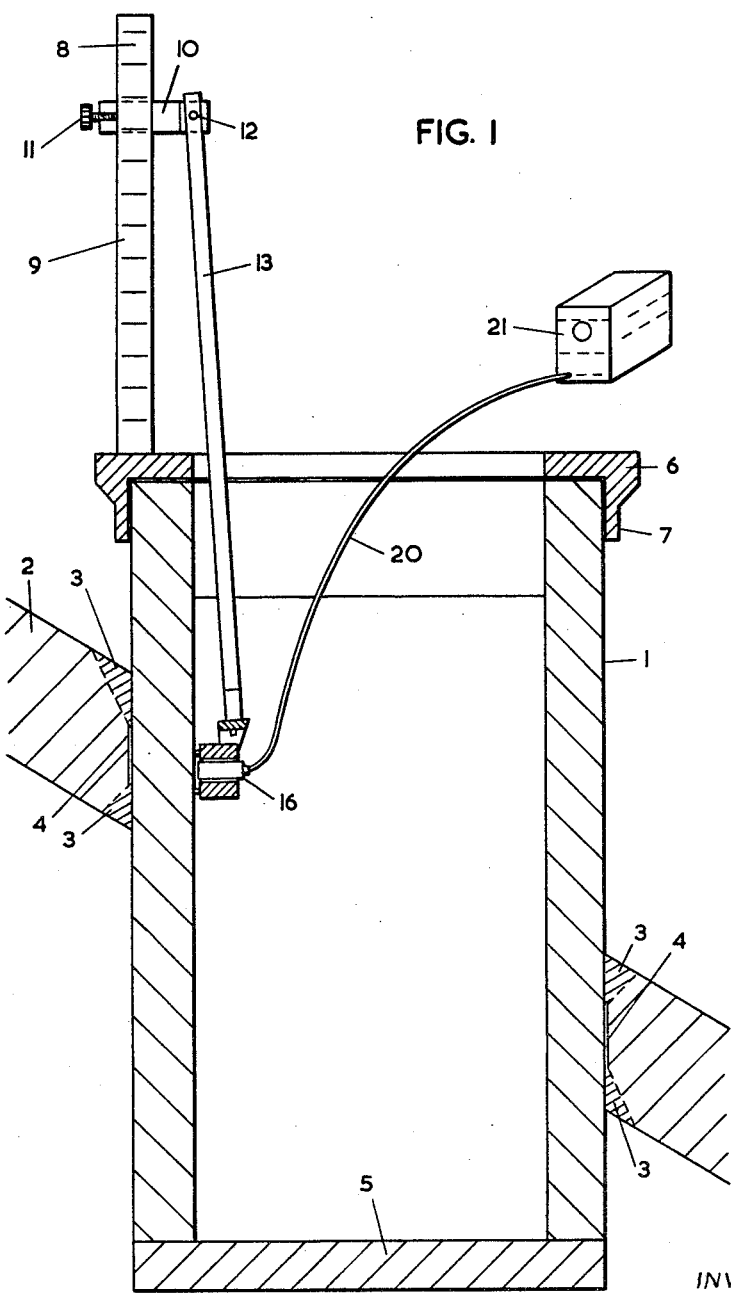

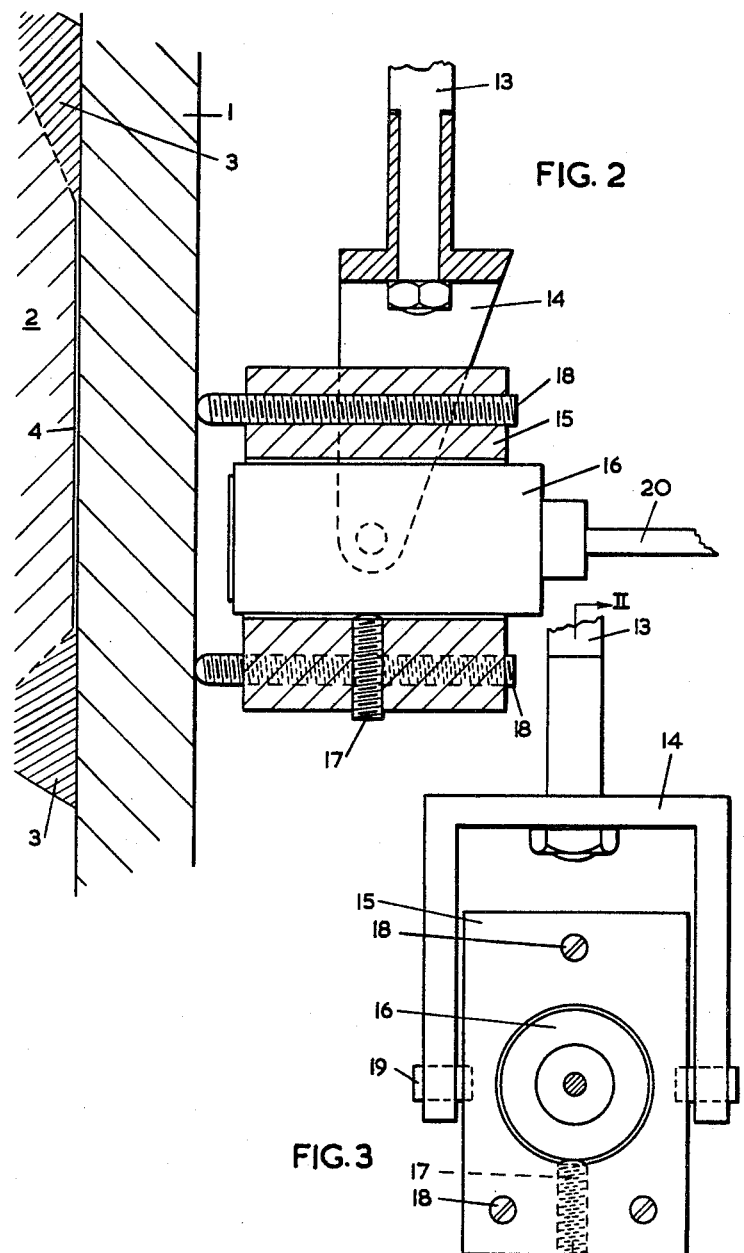

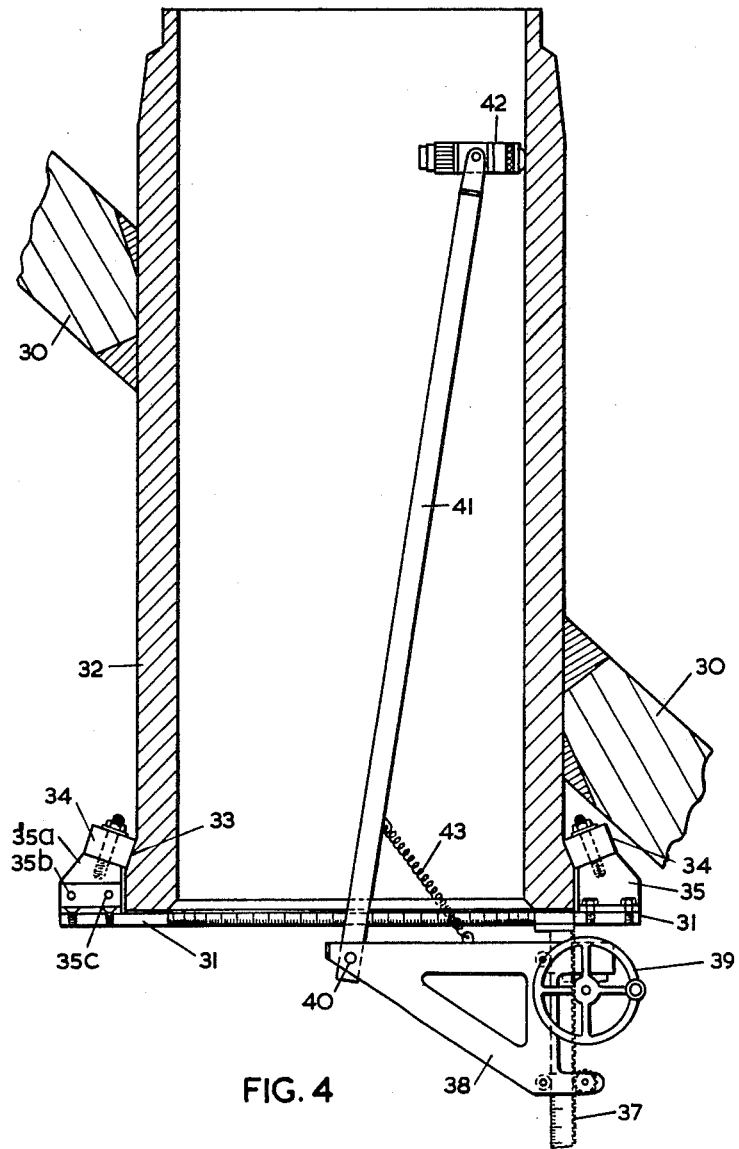

3,002,375
ULTRASONIC TEST APPARATUS
Robert Sydney Martin Moffatt and Kenneth Storer, Darlington, England, assignors to Whessoe Limited, Darlington, England
Filed Dec. 7, 1959, Ser. No. 857,670
Claims priority, application Great Britain Dec. 10, 1958
9 Claims. (Cl. 73—67.8)

This invention relates to apparatus for testing or inspecting solid bodies by the use of ultrasonic vibrations and is concerned with improved means for supporting an ultrasonic probe in properly coupled relationship with the body to be tested.

The invention includes broadly apparatus for adjustably supporting an ultrasonic probe so as to couple it successively to a plurality of different points on the wall of a body shaped as a surface of revolution, comprising a support member adapted to be mounted on the body for rotation about the axis thereof, a pillar mounted on the support member and extending parallel to the axis of the body, an arm pivotally mounted on the pillar at a point adjustable longitudinally of the pillar, so that the arm can swing radially of the body, and a probe carried on the arm, the arm being biased to swing about its pivot until the probe is brought into coupled relationship with the wall of the body.

The invention is described below in its application to the inspection of an annular welded joint made between a plate and a pipe passing through an aperture in the plate, but it will be understood that the invention is not limited to this particular application.

Two arrangements in accordance with the present invention for testing such a weld are shown in the accompanying drawings, in which:

FIGURE 1 is a vertical section through one assembly;
FIGURE 2 is a section taken on the line II—II of FIGURE 3;
FIGURE 3 is an elevation on a larger scale of part of the assembly shown in FIGURE 1; and
FIGURE 4 is a vertical section through another assembly.

FIGURE 1 shows a vertically disposed pipe 1 passing through an aperture in an inclined plate 2 and secured to the plate by fillet type welds 3 on both sides of the plate, a complete non-penetrated band 4 being left between the welds. It is required to examine the weld regions 3 and to determine the upper and lower limits of the non-penetrated band 4. However, the method and means to be described could equally be used in testing a fully penetrated weld.

For the purposes of test, the lower end of the pipe 1 is closed by a blank flange 5 (or other suitable means such as a plug) and the pipe is filled with a suitable liquid to a level above the top of the weld region. A flanged ring 6 is rotatably supported on the top of the pipe, the outside rim of this ring being marked with a scale 7 calibrated in degrees and co-operating with a reference mark made on the outside surface of the pipe just below the flanged ring. The ring 6 carries a vertical pillar 8 of suitable length on which is marked a linear scale 9. Sliding on pillar 8 and keyed to it to prevent rotation is a bracket 10, which can be clamped in any position on the pillar by screw 11. Attached to the sliding bracket by a steel pin 12 is a swing arm 13, which is free to swing radially but not circumferentially with respect to ring 6.

As best shown in FIGURES 2 and 3, the lower end of the swing arm supports a swivel bracket 14, which is rotatable about the substantially vertical axis of arm 13. Held in the jaws of the swivel bracket and free to rotate about a horizontal axis 19 is a probe supporting block 15. A suitably shaped hole in the probe supporting block accommodates an ultrasonic probe 16, which is secured by a clamping screw 17 in such a manner that the face of the probe is approximately parallel to the pipe wall. The probe supporting block is held away from the pipe wall, towards which it tends to swing by gravity, by three adjustable screws 18 and by adjustment of these screws the probe face may be orientated so as to be exactly parallel to the pipe wall. In suitable cases the adjustable screws may be replaced by fixed prongs of predetermined length. Whilst in operation the probe is completely immersed in the liquid and the probe casing and the flexible lead 20, through which it is connected to ultrasonic equipment 21, must be fully impervious to the immersion liquid.

It will be appreciated that by adjusting the positions of the ring 6 and bracket 10, either manually or by power drive the probe 16 can be applied to any desired part of the inner surface of pipe 1, the position of the probe being accurately indicated by the scales 7 and 9. The probe supporting and locating arrangement illustrated in FIGURES 1 to 3 ensures that the position of the probe face with respect to the pipe wall is constant throughout and that a constant layer of couplant is provided between the probe face and the pipe wall by the immersion liquid, thus ensuring that the amount of ultrasonic energy passing between the probe face and the pipe wall remains constant. There is no necessity to use probes with curved faces even for small bore tubes and the arrangement can be used for testing long pipes which are inaccessible by manual means. Wear on the face of the probe is nil and operator fatigue is less than when using the conventional method of manually pressing the probe against the pipe wall with a layer of grease or paste brushed on to the pipe wall to act as a couplant.

In some cases it may be undesirable or inconvenient to close the lower end of the pipe and we have found that the necessity for filling the pipe with liquid can be avoided by the use of a suitable couplant (such as the material sold under the name "Polycell") in the form of a thick jelly-like mass which will remain in position on the surface of the pipe when applied thereto. When using such a couplant, the above mentioned adjustable screws or prongs on the probe supporting block are omitted or withdrawn and the probe is so mounted on the swinging arm which supports it that the ultrasonic beam from the probe will be directed normally to the pipe surface. During operation, a film of the couplant material is maintained between the face of the probe and the surface of the pipe to act as a couplant. The construction and operation of the apparatus may in all other respects be as described above and illustrated in FIGURES 1 to 3 of the drawings.

In certain cases, however, it is impossible or inconvenient to insert the probe and its supporting swing arm through the top of the pipe and FIGURE 4 of the drawings shows a modified form of apparatus in which the probe and swing arm are inserted from the bottom of the pipe.

In the assembly of FIGURE 4, a ring 31 marked with angular graduations is rotatably mounted on the lower end of pipe 32, whose welded connection to plate 30 is to be tested. The lower end of the pipe is thickened as shown, providing an outwardly projecting annular flange, whose sloping top surface 33 serves as a supporting track for three rollers 34 carried by the ring 31. Each roller is mounted in a bracket secured to the ring 31, two of the brackets 35 being of solid construction. The third bracket 35a comprises two parts which are connected by a pivot pin 35b, allowing the roller to be swung outwardly to permit engagement and disengagement of the ring assembly and the pipe. When in position, the roller is swung inwardly to the position shown and the two parts of the bracket are locked together by a pin 35c.

If it were required to employ the apparatus for testing a plain ended pipe, an outer ring shaped to provide an outwardly projecting annular flange suitable for the support of the rollers 34 could be clamped temporarily to the pipe, or any alternative means could be provided for rotatably supporting the ring 31 on the lower end of the pipe.

The ring 31 carries a depending vertical pillar 36 which is marked with suitable graduations and is provided along one edge with rack teeth 37. A bracket 38 is so mounted on pillar 36 that it can move longitudinally thereof but is held against other movement relative to the pillar. A hand wheel 39 on the bracket drives a pinion meshing with the rack 37, thus allowing the bracket to be adjusted vertically as required. The bracket 38 projects radially inward of the pipe 32 and a pivot 40 near its inner end supports a swing arm 41, on whose upper end the ultrasonic probe 42 is mounted in such a manner that the ultrasonic beam from the probe will be normal to the pipe surface. The face of the probe is kept pressed against the pipe surface (with the interposition of the film of couplant) by a tension spring 43 connected between the swing arm and the bracket.

It will be appreciated that by combined rotation of the ring 31 relative to the pipe and vertical movement of the bracket 38 relative to the pillar 36, the probe can be brought to bear against any desired point on the inner surface of the pipe, the position of the probe being indicated by the graduations on the ring and pillar in cooperation with index markings provided on the pipe and on the bracket.

The ring 31 projects inwardly below the lower end of pipe 32 and any tilting of the ring (caused, for example, by the weight of pillar 36 and the parts mounted thereon) is prevented from becoming excessive by the engagement of the ring with the end surface of the pipe wall. The height of rollers 34 above the surface of the ring can if necessary be adjusted (as by the insertion of shims between brackets 35, 35a and the ring) to ensure that the ring when accurately horizontal will lie just clear of the pipe, thereby allowing free rotation but keeping tilting to a minimum. If desired, the ring 31 may carry ball bearings or other antifriction elements for engaging the end surface of the pipe. Where the flange for supporting the rollers 34 is constituted by a separate member temporarily secured to the pipe, this member and not the pipe itself may be arranged to engage the ring and prevent excessive tilting.

Many modifications than those already mentioned may be made to the two embodiments of this invention illustrated in the drawings. For example, instead of using a clamping screw (as shown in FIGURE 1) or a rack and pinion (as shown in FIGURE 4) for holding the bracket (10 or 38) at the position along the length of the pillar (9 or 36) to which it has been adjusted, the bracket may be provided with a spring clamp which makes frictional engagement with the pillar or with a spring mounted ball or catch adapted to enter any one of a series of recesses provided in the pillar. Instead of mounting the ring which constitutes the support member upon rollers which run on an outwardly projecting flange on the pipe (as shown in FIGURE 4), the support ring may be rotatably mounted in a plain bearing formed by a pair of rings secured one above the other against the lower end of the pipe, the inner faces of these rings being recessed to provide an inwardly facing annular channel which receives the periphery of the support ring.

We claim:
1. Apparatus for adjustably supporting an ultrasonic probe so as to couple it successively to a plurality of different points on the wall of a hollow body shaped as a surface of revolution, said apparatus comprising a support member in the form of a ring adapted to be mounted on one end of the body for rotation about the axis thereof, a pillar mounted on the support member which projects away from said body in a direction parallel to the axis thereof, and an arm which extends into the interior of the hollow body, said arm being pivotally mounted on the pillar at a point adjustable longitudinally of the pillar so that the arm can swing radially of the body, and a probe carried on the arm, the arm being biased to swing about its pivot until the probe is brought into coupled relationship with the wall of the body.

2. Apparatus in accordance with claim 1, in which the probe is so supported on the arm that it is angularly adjustable to direct the ultrasonic beam perpendicular to the wall of the body whatever the angular position of the arm.

3. Apparatus in accordance with claim 1, in which the arm is pivotally supported on a bracket which is adjustable longitudinally of the pillar but is restrained against other movement relative to the pillar, means being provided for holding the bracket in any position of adjustment.

4. Apparatus in accordance with claim 1 in which said ring is adapted to be rotatably mounted on the upper end of an open-topped body, the pillar projecting upwardly from the support member and the arm depending into the interior of the hollow body.

5. Apparatus in accordance with claim 4, in which the interior of the hollow body is filled to above the level of the highest point to be tested with water or other liquid for acting as a couplant between the probe and the wall of the body, and locating means carried on the arm adjacent the probe to engage the wall of the body and hold the operative face of the probe at a given spacing from the wall.

6. Apparatus in accordance with claim 1 in which said ring is adapted to be rotatably supported on the lower end of a body which is open at its lower end, the pillar projecting downwardly from the support member and the arm projecting upwardly into the interior of the hollow body.

7. Apparatus in accordance with claim 6 in which the ring constituting the support member is supported by rollers mounted on the ring at intervals around its periphery and running on an annular, outwardly projecting flange adjacent the lower end of the body.

8. Apparatus in accordance with claim 7 in which the annular supporting flange is a permanent part of the body and at least one of the rollers is so mounted on the ring that it can be moved clear of the flange to permit the support member to be disengaged downwardly from the body.

9. Apparatus in accordance with claim 6, in which the ring constituting the support member extends inwardly beneath the lower end of the body, or a part fast thereto, in such a manner as to prevent any excessive tilting of the ring relative to the body.

References Cited in the file of this patent
UNITED STATES PATENTS 2,666,862    Branson _____ Jan. 19, 1954
2,723,357    Van Valkenburg et al. _____ Nov. 8, 1955